United States Patent [19]
Liberty, Jr.

[11] 4,096,932
[45] Jun. 27, 1978

[54] DRIVE FOR POWER TRANSMISSION

[76] Inventor: Joseph C. Liberty, Jr., 4216 Grindley Park, Dearborn Heights, Mich. 48125

[21] Appl. No.: 440,454

[22] Filed: Feb. 7, 1974

[51] Int. Cl.$^2$ .................................... F16D 21/04
[52] U.S. Cl. .......................... 192/48.91; 192/67 R; 74/343
[58] Field of Search ............... 74/745, 343, 345; 192/48.91, 67 R

[56] References Cited

U.S. PATENT DOCUMENTS

| | | | |
|---|---|---|---|
| 1,387,017 | 8/1921 | Smith | 192/67 R X |
| 2,180,597 | 11/1939 | Le Bus | 192/67 R |
| 3,088,336 | 5/1963 | Fodrea | 74/745 |
| 3,200,919 | 8/1965 | Lanigan et al. | 192/48.91 |
| 3,498,155 | 3/1970 | Ivanchich et al. | 74/745 |
| 3,645,147 | 2/1972 | Fodrea | 74/745 X |
| 3,780,840 | 12/1973 | Thomas | 192/48.91 |

Primary Examiner—Samuel Scott
Assistant Examiner—Lance W. Chandler
Attorney, Agent, or Firm—Allan J. Murray

[57] ABSTRACT

A manually shiftable transmission for use in automobiles with the usual driven shaft, axially aligned with a drive shaft. The usual gears, (for example, first, second, third, and fourth gear) are present on said shafts, to transmit a drive from any one gear to said driven shaft. Four sleeves, or driven members, are mounted by splines upon the main shaft and each is slidable thereon longitudinally of the shaft to pair with a gear. Each pair of driven member-and-gear has confronting lateral faces: on each said lateral face is formed one or more dogs to engage with the corresponding dog on a respective confronting face to transmit a drive from the gear to the driven member. The driven members are adapted for sliding travel by shifting forks between a neutral position and a drive position, in which the driven dogs on the driven member engage with the driving dogs on its companion gear.

The dogs are formed with cam faces so inclined to said lateral faces that when a successive gear is engaged by its companion driven member, the dogs of an earlier engaged driven member will disengage from the driving dogs, and said cam faces will co-act to impel the driven member in sliding travel on the driven shaft to a neutral position. Thus, while accelerating, it is unnecessary to employ the shifting forks to disengage a driven member to place such driven member in neutral.

Said cam faces are so formed as to terminate outwardly from the lateral faces from which they project, in a lip. Should the brakes of a vehicle fail, said lips permit of reverse engagement to afford use of an idling engine to retard vehicle speed (as hereinafter explained in detail).

3 Claims, 7 Drawing Figures

U.S. Patent  June 27, 1978  4,096,932
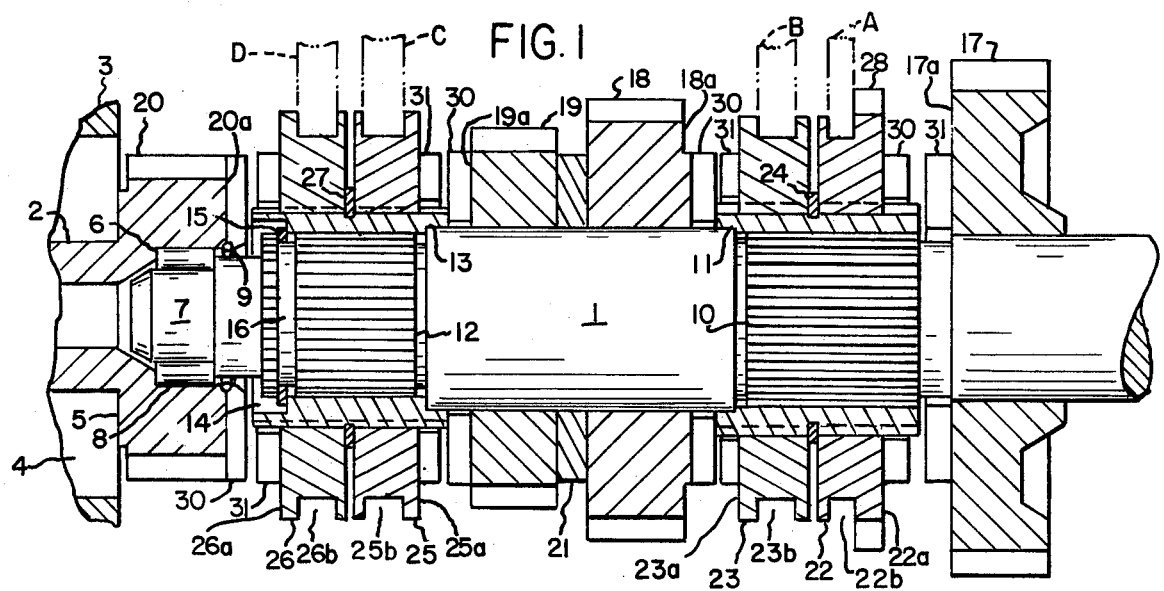
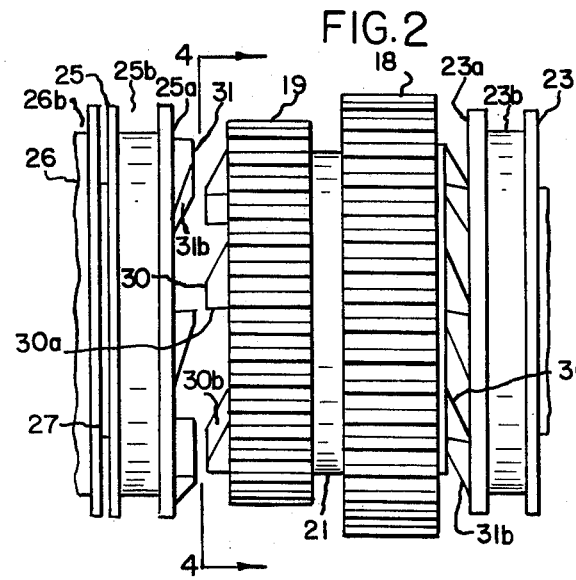
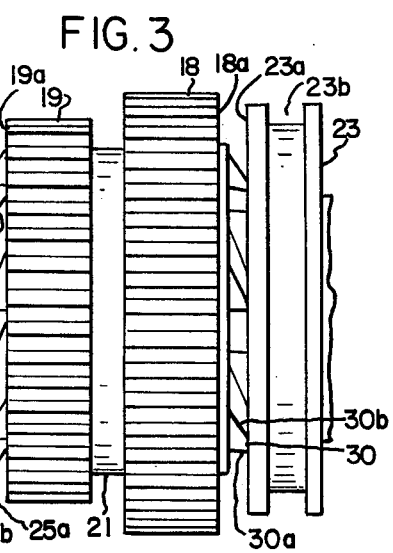
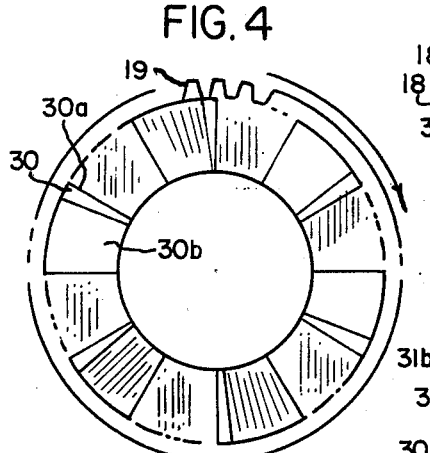
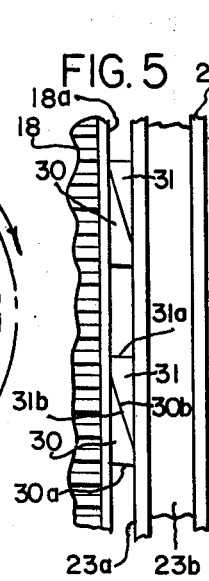
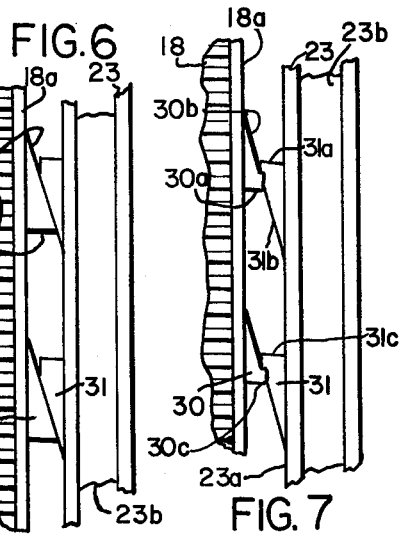

DRIVE FOR POWER TRANSMISSION

FIELD OF INVENTION

The field of invention lies in the area of transmissions which automatically disengage a particular driving gear as a consequence of engagement of the next gear higher in rotative speed to said disengaging gear.

BACKGROUND OF INVENTION

In conventionally shifted automobile transmissions, it is common to form integrally on one hub, two annular gears, spaced apart on said hub and frequently of substantially different diameters and tooth dimensions, as is illustrated in U.S. Pat. No. 3,739,892, issued June 16, 1973, to the present inventor. The hub bearing said two gears, is rotatably mounted on a driven shaft, and is commonly flanked by snap rings to resist movement of the hub longitudinally of the shaft. Of this dual gear (hereinafter called the driving gear), the larger gear receives a constant drive during operation of an automobile, as from a cluster gear on a countershaft.

Such constant drive serves merely to rotate the gear on the drive shaft, until it is drivably interconnected with said shaft by a synchronizer assembly and a driven member mounted on this shaft to impart a rotational drive to said shaft. Said synchronizer assembly (as is disclosed in the aforesaid patent) is disposed on the driven shaft adjacent to the driving gear, and may include an interiorly splined clutch hub mounted upon a splined portion of the drive shaft to transmit a positive drive to the drive shaft. The exterior circumferential surface of the clutch hub is formed with a set of gear teeth. Mounted upon said exterior circumferential surface is an annular member or sleeve (which may include a gear) having its interior diameter formed with teeth which slidingly engage with the clutch hub teeth.

The engagement of the driven member on the clutch hub is such that the driven member is afforded reciprocable sliding travel on said hub, so that it may be slid, as by a shifting fork, to engage its interior gear teeth with the smaller set of gear teeth on said driving gear. Such engagement completes a positive drive from the driving gear through the driven member to the clutch hub, and thence to the drive shaft. To facilitate shifting, which is the engagement or disengagement of the driven gear with the second gear the driving gear, it has been customary to complete the synchronizer assembly with a ring, usually made of brass, having limited floating travel longitudinally of the driven shaft. As illustrated in a rather elementary manner in the drawings in said U.S. Pat. No. 3,739,892, and particularly in FIGS. 1, 2 and 3 thereof, the circumferential extent of the clutch hub is interrupted by three radially, equally spaced notches, and the brass ring is further provided with corresponding notches, so that a key may interengage the brass ring with the clutch hub and still afford the floating travel of the brass ring.

A portion of the hub of the driven gear is exteriorly tapered to form a truncated cone, upon which the brass ring frictionally engages to receive an initial drive which is intended to increase the speed of rotation of the driven gear to correspond to that of the driving gear, prior to the engagement of the aforesaid interior teeth of said driven gear with said smaller gear of the driving gear.

In the conventional manually shafted transmission, as described above, through means of shifting forks, the successive higher-speed gears of the transmissions are engaged by manually shifting out of each preceding gear and into each successive gear until the highest gear is engaged.

SUMMARY OF INVENTION

Invention resides in providing one or more driving gears, each paired with one or more driven members, which members are drivingly carried upon a driven shaft, in a manner to have limited sliding travel longitudinally of said shaft, and in the provision of a lateral face in each gear confronting a lateral face on each driven member, and normally spaced from each other.

Invention is believed further to reside in providing upon the lateral face of each driving gear at least one driving dog to engage with a companion driven dog upon the confronting lateral face of each driven element.

Invention is further believed to reside in the provision of a cam surface on each driving dog, and an oppositely similar cam surface on each driven dog, which affords utilization of the higher speed of rotation of each successive gear (will respect to each preceding gear) to engage the respective cam surfaces to impel the disengaging companion driven member in sliding travel to its normal, neutral position.

DESCRIPTION OF THE DRAWINGS

The invention is disclosed in the following views, wherein:

FIG. 1 is a vertical, elevational view in partial section showing a portion of the drive shaft, and the driven shaft, with the respective companion gears and driven elements.

FIG. 2 is a vertical, elevational, partial view showing the driving position of a driving gear and a driven element, and the neutral position of the next successive driving gear and its companion driven element.

FIG. 3 is a partial, elevational view showing the driving engagement of said next successive gear and its companion driven member, and an intermediate position of disengagement of the preceding gear and its companion driven element.

FIG. 4 is an elevational view of said next successive gear, taken on line 4—4 of FIG. 2.

FIG. 5 is a partial, fragmentary, elevational view drawn with disregard for true perspective, to illustrate the cam slopes engaging to initiate the sliding travel of a driven element toward its neutral position.

FIG. 6 is a view similar to FIG. 5, showing a progressive step in the engagement of said cam slopes as the driven element is cammed longitudinally of the shaft toward its neutral position.

FIG. 7 is a partial, fragmentary view similar to FIGS. 5 and 6, showing a modification of the driving dogs, and their cam faces, to form said lips, to afford said reverse engagement.

In these views, the reference numeral 1 designates a driven shaft, and the numeral 2 designates a drive shaft in axial alignment with said driven shaft. FIG. 1 discloses a portion of a transmission housing 3, formed with an aperture 4 to receive a suitable bearing (not shown) to journal the end portion of the drive shaft 2. Said drive shaft terminates interiorly of the transmission housing in an annular head 5, which is formed with a circular recess 6, to receive the end portion 7 of the driven shaft 1. Said end portion 7 is reduced in diameter, and journals in a suitable bearing 8 received in the circular recess 6. A snap ring 9 resists the escape from said circular recess 6 of the bearing 8.

The driven shaft 1 is formed with a first set of splines 10 upon which is received a hub 11. The hub is interiorly formed with complementary splines, to effect a driving relationship with said driven shaft, and said hub may be restrained from movement longitudinally of said shaft by a snap ring or the like (not shown). A second set of splines 12 is formed on said shaft, and receives a second hub 13. The latter hub is formed with a circular recess 14 to receive a snap ring 15 which resists escape of the hub from said splines longitudinally of the driven shaft, and is received in an annular groove 16 formed in the splined area 12.

Shown in FIG. 1, from right to left is a first gear 17, a second gear 18, and third gear 19, all of which are rotatably mounted upon the shaft upon suitable bearings (not shown). The fourth gear 20 has its teeth formed circumferentially upon said annular head 5 of the driven shaft 2. A ring 21 separates the second gear 18 from the third gear 19.

Received upon the first hub 11 is a first driven member 22, which is paired with said first gear 17, and a second driven member 23 which is paired with said second gear 18. The two driven members 22, 23 are separated by a snap ring 24 received in the hub 11. The second hub 13 receives a third driven member 25, which is paired with the third gear 19, and a fourth driven member 26 which is paired with the fourth gear 20. A snap ring 27 separates said driven members 25 and 26. The first driven member 22 circumferentially carries gear teeth 28 for reverse gear, which may be interconnected by an idler gear (not shown) to the countershaft when desired.

The drive shaft, through the fourth gear 20, transmits a drive to the aforesaid cluster gear (not shown) rotatably mounted upon a countershaft (not shown) to the respective gears 17, 18, and 19. In their sequence from right to left, as shown in FIG. 1, each successive gear rotates at a speed higher than that of any of the next preceding gears. That is, the gear 20 has a higher rate of rotation that does the gear 19, which has a higher speed of rotation than does the gear 18, which has a higher speed of rotation than does the gear 17.

It should be clear now, that none of the gears will transmit a drive to the driven shaft 1 until and unless it is drivably engaged with its companion driven member, whereby a drive is transmitted through the splined hub, and thus to the shaft. It is assumed to be clear, also, that each driven member is interiorly splined or toothed, to be received upon and to rotatably drive its respective hub.

First gear 17 has a lateral face 17a opposed to, or confronting a lateral face 22a on the first driven element 22. The second gear 18 has a lateral face 18a confronting a lateral face 23a on a second driven element 23; third gear 19 has a lateral face 19a confronting a lateral face 25a on the third driven member 25, and the fourth gear 20 has a lateral face 20a confronting a lateral face 26a on the fourth driven member 26.

The gears 17, 18, and 19 are longitudinally immobile upon the driven shaft, which immobility may be accomplished as by a snap ring or adjacent bearing member (not shown) where suitable. The driven members 22, 23, 25, and 26, are all drivably mounted upon the shaft 1, and each driven member is necessarily driven at the speed determined by whichever gear is engaged with its companion driven member. To transmit a drive from a gear to such driven member, the said respective lateral faces are provided with respective driving and driven dogs.

For convenience, all driving dogs are designated by reference character 30, and all driven dogs by the numeral 31. Shifting forks designated as A, B, C and D are received in suitably prepared grooves 22b, 23b, 25b, and 26b of their respective driven members. Each driven member has reciprocable sliding travel upon its respective hub between a normal, neutral position relative to its companion gear, and a driving position of engagement with its companion gear. In said latter position, said respective, complementary dogs are drivingly engaged as between gear and driven member. Said shifting forks are interconnected with suitable shifting mechanism (not shown) to effect sliding travel of driven member 22 to engage the dogs 30 with the dogs 31, whereupon a drive is established from the gear 17 through the dogs 30 and 31 to the driven member 22, and thence through the hub 11 to the drive shaft.

There is no necessity in the present invention to shift the driven member 22 from engagement with the gear 1. Rather, when speed of a vehicle is deemed sufficient, the driven member 23 is slid leftwardly by the shifting fork B to engage the driven dogs 31 on said member 23 with the driving dogs 30 on gear 18. The driving faces 30a and driven faces 31a of said respective dogs engage, and gear 18, rotating at a speed faster than that of gear 17, drives the driven member 23 at the same, higher speed, which in turn necessarily drives the driven member 22 at such higher speed, causing the driven dogs 31 upon said driven member 22 to draw rotatively away from the driving dogs 31a on first gear 17.

Again, there is no need to disengage driven member 23 from gear 18, but rather, driven member 25 is slid rightwardly by shifting fork C to engage its driven dogs 31 with the driving dogs 30 of gear 19, and again, gear 19 driving at a higher rotational speed than gear 18, and consequently driving driven member 23 at such higher rate of speed will cause the driven dogs 31 on driven member 23 to rotatably withdraw from the driving dogs 30 on gear 18 as is shown in FIG. 3, with the effect of engaging the cam surfaces 30b, 31b as shown in FIG. 5, which imparts lateral travel to the driven member 23 to impel it in said reciprocable sliding travel to its neutral position.

If the vehicle employing the present transmission should "lose its brakes" and the driver be unable to bring such vehicle to a stop, the driven shaft 2 would continue to be driven through the differential, from the rear wheels, by the inertia of the vehicle. Clearly, should a person be attempting to use the brakes and find that they will not work, the engine in an ordinary vehicle will be decelerating, and conceivably even idling. In order to effect some control over the speed of a vehicle in this situation, it is proposed to form the cam faces with a lip 30c, 31c on at least the highest speed gear and its companion driven element so that by manipulation of the shifting mechanism, the driven element 26 could be driven in its sliding travel toward its position of driving engagement, and since in this circumstance, it is postulated that the driven shaft will be rotating more quickly than the drive shaft, the lips 30c, 31c will engage to afford a retarding effect from the idling motor upon the more rapidly rotating driven shaft with the consequent effect of slowing the speed of the vehicle.

Advantages to be gained from the use of the hereinbefore described transmission are that from the engagement of first gear, there is constant driving force applied to the rear wheels, and there is no interruption of said constant driving force in order to shift from first gear to second, second to third, etc. Rather, as aforesaid the transmission is shifted to engage first gear, and when sufficient speed is generated, the second gear is engaged, and as described above, initiates a faster drive to the rear wheels, even though the first gear is still engaged, Also, as stated above, the faster drive effects a disengagement from the driving position of the driven element 22 from first gear 17 so that a smooth and uninterrupted transition from first gear through the fourth gear is attainable.

It is further believed that such uninterrupted shifting, with the consequent uninterrupted acceleration of the engine, will save fuel by averting the necessity of allowing the engine to slow during shifting and then consuming fuel to bring said engine to, and surpass, its former peak speed. It is further believed that since fuel is combusted more effeciently at higher speeds, that pollution will be mitigated by maintaining a constant and uninterrupted acceleration.

The driving faces 30a and driven faces 31a are inclined at an angle of approximately 5° to their respective lateral faces, so that when engaged, a locking effect is attained to resist any tendency of the rotational force to impel the driven member out of engagement when disengagement is not desired.

Further advantages of this invention derive from the employment of shifting forks A, B, C, and D, for each of the driven elements, and this assures, should it be necessary, that there can be a positive force to establish the driven elements in a neutral position. It is contemplated that the camming surfaces will, as above described, normally suffice to impel the driven elements to their neutral positions, carrying the shifting forks with them. Further, the gears and elements are left in a stronger configuration since no further machining is necessary in order to provide springs or levers or the like to return them to neutral and retain them in a neutral position.

What I claim is:

1. A power transmission device including, a drive shaft,
   at least one rotatable driving element carried by said drive shaft,
   a driven shaft,
   at least one rotatable driven member carried by said driven shaft,
   drive means carried by said driving element,
   driven means carried by said driven member,
   said driven member having sliding travel between a neutral position and a position of releasable driving engagement wherein said drive means is releasably engaged with said driven means,
   an actuator to effect said sliding travel of said driven member,
   said driving engagement being effective to impart a rotational drive to said driven member, when the rotational speed of said driving element exceeds the rotational speed of said driven member, wherein the improvement comprises,
   a first adapting means adapting said drive means for reverse engagement with said driven means in the sliding travel of said driven member when the rotational speed of said driven member exceeds the rotational speed of said driving element, to retard the rotational speed of said gear,
   a second adapting means adapting said driven means to receive such reverse engagement,
   a first lateral face on said element,
   a second lateral face on said member, confronting said first lateral face,
   said drive means being carried by said first lateral face, and said drive receiving means being carried by said second lateral face,
   said drive means including a driving surface disposed approximately transversely to said first lateral face,
   said driven means including a drive receiving surface disposed for engagement by said driving surface,
   a first cam surface inclined relative to and convergent with said drive surface,
   a second cam surface inclined relative to and convergent with said drive receiving surface,
   said cam surfaces co-acting to impel said driven member from said rotatable driving element to a neutral position when the rotational speed of said member exceeds the rotational speed of said element, and;
   said first and second adapting means being lips formed respectively on said first cam surface and said second cam surface, for selective engagement of said lips responsive to said actuating means.

2. A power transmission device as set forth in claim 1,
   said at least one rotatable driving element including a plurality of consecutively disposed annular gears,
   each successive gear having a higher rotational speed than the next proceding gear,
   said at least one driven member including a plurality of consecutively disposed driven members,
   each driven member constituting a pair with a respective driving gear, and
   means rotatively interconnecting said driven members, whereby
   as each successive gear engages with its respective driven member, it drives all said driven members at a rotative speed exceeding that of a preceding driving element, causing said first cam surface and said second cam surface to impel the last preceding member into its neutral position.

3. A power transmission device as set forth in claim 1,
   said at least one rotatable driving element including a plurality of consecutively disposed annular gears,
   each successive gear having a higher rotational speed than the next preceding gear,
   said at least one driven member including a plurality of consecutively disposed driven members,
   each driven member constituting a pair with a respective driving gear, and
   means rotatively interconnecting said driven members, whereby
   as each successive gear engages with its respective driven member, it drives all said driven members at a rotative speed exceeding that of a preceding gear, causing said first cam surface and second cam surface to impel the last preceding member into its neutral position.

* * * * *

UNITED STATES PATENT AND TRADEMARK OFFICE
CERTIFICATE OF CORRECTION

PATENT NO. : 4,096,932

DATED : June 27, 1978

INVENTOR(S) : Joseph C. Liberty, Jr.

It is certified that error appears in the above–identified patent and that said Letters Patent are hereby corrected as shown below:

Column 6, line 33, delete "proceding" and insert --preceding-- therefor;

Signed and Sealed this

Twenty-sixth Day of December 1978

[SEAL]

Attest:

RUTH C. MASON
*Attesting Officer*

DONALD W. BANNER
*Commissioner of Patents and Trademarks*